United States Patent
Büchler (10) Patent No.: US 6,414,917 B1
(45) Date of Patent: Jul. 2, 2002

(54) DEVICE FOR READING OPTICAL RECORDING MEDIA HAVING IMPROVED TRACK ERROR SIGNAL CORRECTION

(75) Inventor: Christian Büchler, Villingen-Schwenningen (DE)

(73) Assignee: Thomson Licensing, S.A., Boulogne-Billancourt (FR)

( * ) Notice: Subject to any disclaimer, the term of this patent is extended or adjusted under 35 U.S.C. 154(b) by 0 days.

(21) Appl. No.: 09/182,031

(22) Filed: Oct. 29, 1998

(30) Foreign Application Priority Data

Oct. 31, 1997 (DE) .......................... 197 48 188

(51) Int. Cl.$^7$ .................................................. G11B 7/00
(52) U.S. Cl. .................................. 369/44.26; 369/44.34
(58) Field of Search ........................ 369/44.11, 44.26, 369/44.34

(56) References Cited

U.S. PATENT DOCUMENTS

| | | | | |
|---|---|---|---|---|
| 4,787,076 A | * | 11/1988 | Deguchi et al. | 369/44.34 |
| 4,855,983 A | * | 8/1989 | Arai | 369/44.34 |
| 4,866,688 A | * | 9/1989 | Ohtake et al. | 369/44.13 |
| 5,268,887 A | | 12/1993 | Honguh et al. | 369/44.34 |
| 5,408,452 A | * | 4/1995 | Sakemoto et al. | 369/44.26 |
| 5,434,834 A | | 7/1995 | Shinoda et al. | 369/44.13 |
| 5,481,526 A | | 1/1996 | Nagata et al. | 369/124 |
| 5,587,992 A | | 12/1996 | Hayashi | 369/275.4 |
| 5,859,820 A | * | 1/1999 | Nagasawa et al. | 369/44.26 |
| 6,192,009 B1 | * | 2/2001 | Kim | 369/44.34 X |
| 6,233,208 B1 | * | 5/2001 | Sasaki | 369/44.34 X |

FOREIGN PATENT DOCUMENTS

| | | | | |
|---|---|---|---|---|
| EP | 0457536 A | 11/1991 | ............ | G11B/7/09 |
| EP | 0757343 A1 | 2/1997 | ............ | G11B/7/007 |
| EP | 0769776 A | 4/1997 | ............ | G11B/7/085 |

OTHER PUBLICATIONS

JP06282849 A, (abstract), Jul. 10, 1994.
Austrian Search Report citing the above–listed reference: AR.
Patent Abstracts of Japan, vol. 197, No. 07, Jul. 31, 1997 & JP 09 063085A, of Mar. 7, 1997.
Patent Abstracts of Japan, vol. 018, No. 445, Aug. 18, 1994, & JP 06 139602A of May 20, 1994.
European Search Report citing the above–listed references: AA, AM, AN, AR, and AS.

* cited by examiner

Primary Examiner—Aristotelis M Psitos
(74) Attorney, Agent, or Firm—Joseph S. Tripoli; Frederick A. Wein (57) ABSTRACT

The present invention relates to a device for reading from and/or writing to an optical recording medium, which has a data track having a first area, which is provided for markings arranged centerd with respect to the center of the data track, and at least one further area, which is provided for markings arranged laterally offset with regard to the center of the data track. Corresponding devices have detection means, track error detector, signal shaping means, and correction signal generation means. The object of the present invention is to propose a device of the generic type in which an accurate correction signal for the track error signal can be obtained without a high outlay, and also a method for generating a corresponding correction signal. This object is achieved according to the invention by the fact that the signal shaping means has an averaging unit, whose output is connected to an input of the correction signal generation means. The invention can be employed preferably in CD players, CD recorders, DVD reproduction and recording devices and the like.

16 Claims, 5 Drawing Sheets

DEVICE FOR READING OPTICAL RECORDING MEDIA HAVING IMPROVED TRACK ERROR SIGNAL CORRECTION

PRIORITY INFORMATION

The benefit under 35 USC 119 is claimed of German application No. 197 48 188.4 filed Oct. 31, 1997.

FIELD OF THE INVENTION

The present invention relates to a device for reading from or writing to optical recording media, which have a data track having markings arranged both centred with regard to the said data track and offset with respect to the said data track.

BACKGROUND OF THE INVENTION

A device of this type is disclosed in EP-A-0 457 536. This device is suitable for reading an optical recording medium which has a data track having a first area which is provided for markings arranged centred with respect to the centre of the data track. These markings are often referred to as pits as well. The data track has, moreover, further areas in which markings are provided which are arranged laterally offset with regard to the centre of the data track. The device has a beam generation means for generating a beam which is directed onto the data track and is guided by a tracking means along the data track. A detection means converts the beam which comes from the recording medium and is modulated by the latter into detector signals which are fed to a track error detector for the purpose of determining a track error signal, and to a signal shaping means for the purpose of forming a shaped data signal. The shaped data signal is in this case subjected to a sample and hold operation in each case at the beginning of one of the offset areas. The difference between two held signals is formed, integrated and added to the track error signal, determined by the track error detector, as correction signal. The corrected track error signal is fed to the tracking means. It may be offered as a disadvantage of this known device that the determination of the correction signal is highly time-critical since the value of the shaped signal is sampled and then held only in accordance with a brief pulse in each case. This leads to an inaccurate result since the data signal rises and falls to a great extent, as a result of which even small temporal inaccuracies in the course of sampling the value to be held have a major influence on the held value.

SUMMARY OF THE INVENTION

The object of the present invention is to propose a device of the generic type in which an accurate correction signal for the track error signal can be obtained without a high outlay, and also a method for generating a corresponding correction signal.

This object is achieved by the fact that the signal shaping means has an averaging unit, the output of the averaging unit being connected to an input of the correction signal generation means. This has the advantage that higher accuracy can be achieved since an averaged value is fed to the correction signal generation means, which value has fewer large fluctuations. A further advantage is that it is possible to identify even small deviations in the average value which are not conspicuous on observation of the shaped data signal. Even such small deviations are taken into account in the device according to the invention, which contributes to the high accuracy of the correction signal.

The averaging unit is advantageously part of a so-called data slicer, which generates a modulated signal from the signal modulated by the recording medium by comparison with the comparison signal supplied by the averaging unit, which modulated signal is the input signal of the averaging unit. This has the advantage that the data slicer, as an element of the device which is present in any case, is additionally utilized for correction signal determination, thereby obtaining a reduced outlay.

The invention provides for the averaging unit having at least two comparison signal generation paths, which can be activated by a switching means in dependence on the scanned area of the data track. This has the advantage that an average value or comparison value which is not influenced during the scanning of the other areas of the data track, and, consequently, during renewed scanning of a corresponding area, has with high probability the optimum value for this area, is formed for each area of the data track. Thus, the use of different comparison signal generation paths also increases the quality of the shaped data signal since negative influences which may be caused by the other areas are avoided.

It is advantageous for the correction signal generation means also to have at least two signal processing paths, whose inputs can be connected by the switching means to the input of the correction signal generation means. Here, too, the advantage is that the average or comparison value is optimized to an area of the data track and not influenced by the other areas, as a result of which fluctuations in the average value, which is often referred to as slice level as well, in the event of a change from one area to another do not occur. The quality of the correction signal generated is thereby increased.

The invention provides for a holding element or an integration element to be assigned to a signal processing path. This has the advantage that a fast reaction is enabled via the proportionally acting holding element, while overshooting given the possible occurrence of defective pits is avoided by means of an integration element. It is particularly advantageous to provide a plurality of paths, of which one portion is finished with a proportional characteristic and one portion is finished with an integrating characteristic, the signals of which are subsequently combined in order to exploit the advantages of both characteristics.

The invention furthermore provides for the output of a first and of a second signal processing path to be connected to the input of a difference forming unit. This has the advantage that the relative central position of the areas of the data track which are assigned to these signal processing paths is defined. If the areas are removed to the same extent, but in different directions, from the central position of the data track, then the relative central position should correspond to the value zero. If it deviates from this, then correction is necessary. If the distances between the respective areas and the centre of the data track differ, then weighted difference formation is advantageously provided, which takes account of this asymmetry.

It is advantageous for the outputs of a plurality of difference forming units to be summed. This has the advantage that an optimum correction signal is obtained by the combination of a plurality of signal processing paths, for example having a proportional and an integrative characteristic.

The invention furthermore provides for the correction signal generation means to have at least one amplification element having a variable gain factor. This has the advantage that the complete correction signal can be adapted by amplification to different device properties or different conditions. Different operating conditions are governed for example by the type of recording medium currently being used, this being expressed in the reflectivity, for example.

According to an alternative configuration of the invention, it is provided that the correction signal generation means has at least two signal processing paths, whose inputs can be connected by a switching means to at least one output of the detection means in accordance with the respectively scanned area of the data track. This has the advantage that the correction signal is generated even if the averaging unit should not generate a correct output value. For example, the signal of a single detector element is present at the output of the detection means, but provision is preferably made for using a combination of the signals of a plurality of detector elements, such as the summation signal of all the detector elements, for example. The signal processing paths preferably evaluate the amplitude of the signal respectively present and hold their output value as long as no input signal is present.

The method according to the invention consists in the track error correction signal being formed from a comparison signal, with which is compared a detector signal of the detection means for the purpose of forming a shaped data signal. This has the advantage that a signal which is present in any case is advantageously utilized for the purpose-of forming a correction signal. It is thus not necessary to form an additional signal for correction signal generation.

The invention provides for different comparison signals, which are used to generate the track error correction signal, to be provided for the scanning of different areas of the data track. This has the advantage that the quality of the shaped data signal is increased since errors which may occur during a transition between the individual areas of the data track are avoided by this means.

It is advantageous to make use exclusively of comparison signals which correspond to one of the further areas of the data track, that is to say markings arranged offset with respect to the centre of the data track. This has the advantage that the correction signal formation is performed particularly effectively since the said areas have a relatively large deviation which is relatively simple to detect.

Further advantages of the invention will also emerge from the following description of advantageous exemplary embodiments of the present invention. It is understood here that the invention is not restricted to the exemplary embodiments specified.

DETAILED DESCRIPTION OF PREFERRED EMBODIMENTS

Figure 1:
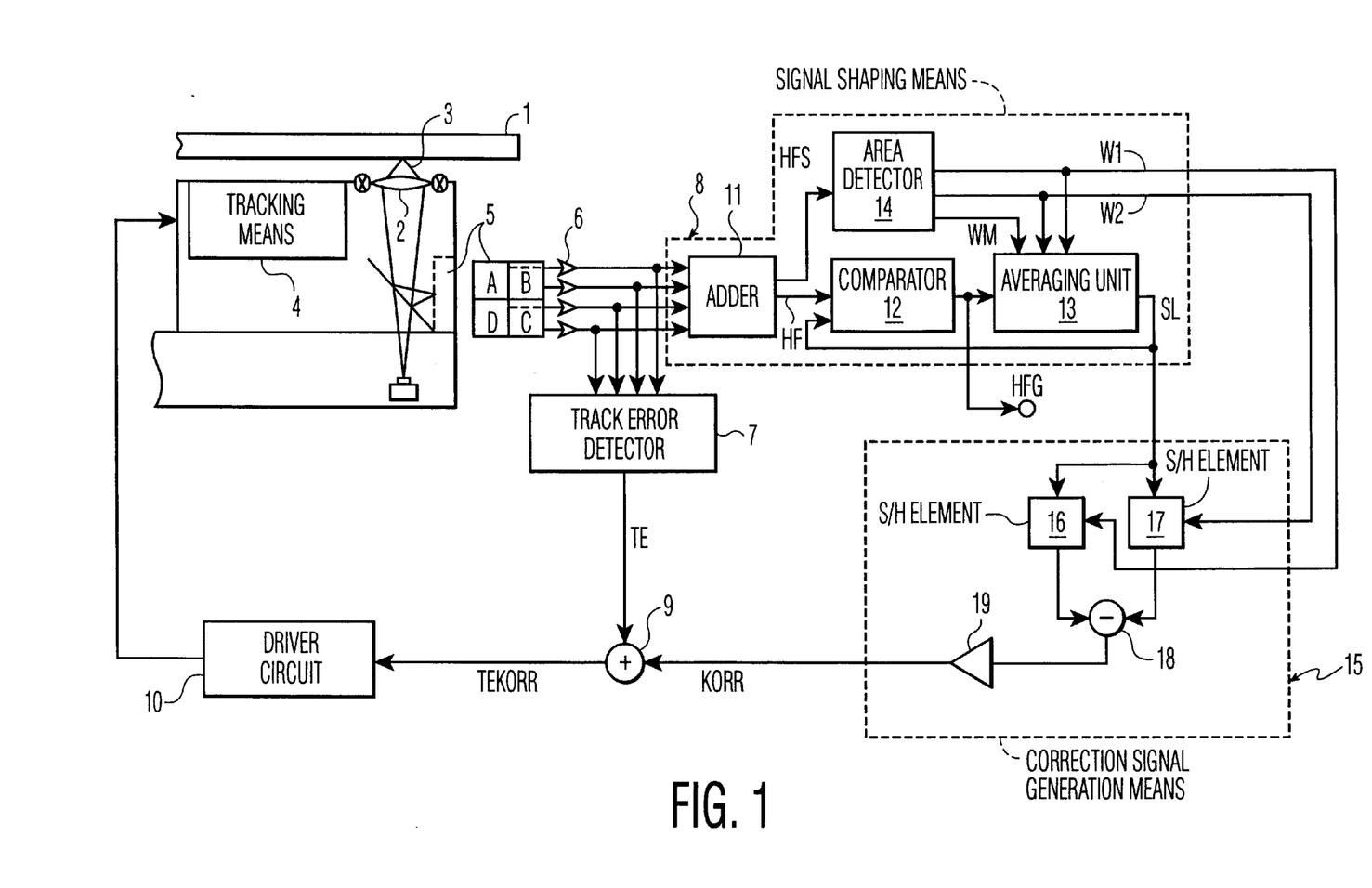
FIG. 1 shows a block illustration of a device according to the invention.

FIG. 1 shows a diagrammatic block illustration of a device according to the invention. An optical recording medium 1 is scanned by means of a light beam 3 focused by a lens 2. The lens 2 can be displaced by a tracking means 4 parallel to the scanned area of the optical recording medium 1. A displacement of the lens 2 causes a displacement of the focused light beam 3 on the information-carrying area of the recording medium 1. This enables tracking along a data track located on the recording medium 1. The generation of the light beam 3 and also the optical components necessary for this purpose are known to a person skilled in the art and, therefore, are not explained in any more detail here. The light beam 3 is modulated by the optical recording medium, for example in terms of its intensity, phase angle, polarization direction or the like, is reflected and directed onto a detection means 5 by suitable optical elements. The detection means is represented both in a side view, in a dashed illustration, and in a plan view, that is to say turned through 90°. In the exemplary embodiment, the said detection means consists of four photoelements A, B, C, D arranged in the form of quadrants. The output signals of the photoelements A, B, C, D are amplified by means of amplifiers 6 and fed to a track error detector 7 and also to a signal shaping means 8. In the track error detector 7, a track error signal TE is generated by one of the known track error detection methods and to it is added a correction signal KORR at an information point 9 in order to form a corrected track error signal TEKORR. The corrected track error signal TEKORR is fed to a track regulator, referred to as driver circuit 10 in the following text, which drives the tracking means 4 in accordance with its input signal.

The signal shaping means 8 has an adder 11, a comparator 12, an averaging unit 13 and also an area detector 14. In the adder 11, a high-frequency signal HF modulated in accordance with the information items located on the recording medium 1 is formed from the amplified output signals of the photoelements A, B, C, D by a summation. In order to be able to read the information items contained on the recording medium 1, that is to say the data content, use is made of the comparator 12 and also of the averaging unit 13. This combination is often referred to as data slicer as well. The comparator 12 compares the high-frequency, modulated signal HF with a comparison signal SL, which is output by the averaging unit 13 and is also referred to as slice level. The comparator 12 outputs a shaped data signal HFG, which is a square-wave signal and is forwarded for further processing to assemblies of the device according to the invention which are not illustrated here. The averaging unit 13 forms an average value from the shaped data signal HFG which is output as comparison signal SL. As a result, the comparison signal SL is always established in such a way that the square-wave signal, the shaped data signal HFG, is, on average, positive for the same amount as it is negative, with the result that the surface integral tends to zero. The data located on the recording medium 1 are coded correspondingly, with the result that the average value over time of the shaped data signal HFG is zero. Intensity fluctuations which may be caused for example by changing reflectivity of the recording medium 1 can be compensated for in this way.

In order to ensure that the information items which are or can be recorded in the different areas of the data track of the optical recording medium 1, which are described further below, are read reliably even at their interfaces with one another, a specific comparison signal SL, SLEN, SLW1, SLW2 is formed for each area. The corresponding comparison signals SL are activated using the output signals of the area detector 14 in a manner appropriate to the area to be read. For this purpose, a high-frequency signal HFS is fed to the area detector 14, which signal is likewise provided, for example, as illustrated in the exemplary embodiment, by the adder 11, but may also perfectly well originate from other sources.

The signal (A+D)−(B+C) used for the so-called push-pull tracking method is advantageously used for the high-frequency signal HFS. A similar high-frequency characteristic is also exhibited by the signal (A+B)−(C+D), which is likewise formed from the signals of the photoelements A, B, C, D. One of these signals or another, correspondingly suitable signal is used, depending on the design. The area detector 14 has, for example, an envelope detector which detects both the low-frequency envelope signal of the positive and that of the negative amplitudes of the high-frequency signal HFS and generates logic signals therefrom with the aid of which the currently scanned area of the data track is unambiguously identified. These signals are designated as signal WM, for identifying markings arranged centred with respect to the data track, and also as signal W1 and as signal W2, for identifying markings arranged such that they are displaced to the left and to the right with regard to the centre of the data track. The signals WM, W1 and W2 are fed to the averaging unit 13, which correspondingly adapts the comparison signal SL, that is to say outputs a signal SLWM, SLW1 or SLW2. Both the comparison signal SL and the signals W1 and W2 are fed to a correction signal generation means 15. In its simplest configuration, the correction signal generation means 15 has two sample-and-hold elements 16, 17, which, each time the signal W1 and W2, respectively, is present, sample the comparison signal SLW1 and SLW2, respectively, that is currently present and hold the sampled value in the absence of the signal W1 and W2, respectively. The outputs of the sample-and-hold elements 16, 17 are connected to a difference forming unit 18, whose output signal, if appropriate amplified by means of an amplifier 19, is the correction signal KORR.

Figure 5:
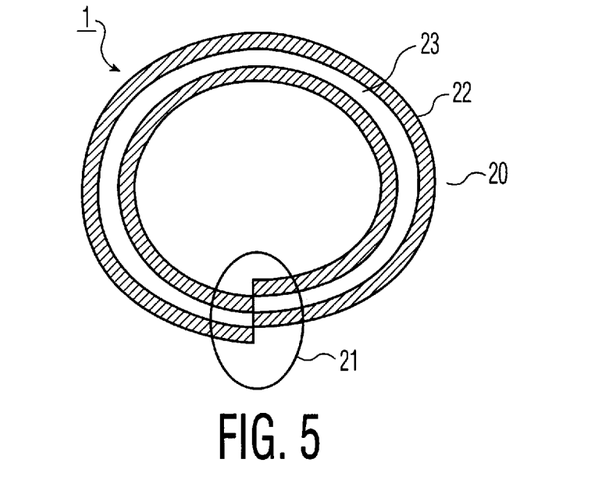
FIG. 5 shows a diagrammatic illustration of a recording medium which can be read from and/or written to by a device according to the invention.

FIG. 5 shows a diagrammatic illustration of a recording medium 1 which can be read from and/or written to by a device according to the invention. Three turns of a data track 20 are illustrated with their width greatly exaggerated. The data track 20 is formed in a spiral and changes at least one of its properties after each revolution. This is emphasized in FIG. 5 by the transition area 21 identified by means of an ellipse. The parts of the data track 20 which are shown dark are formed by depressions 22 in the information-carrying plane of the optical recording medium 1, while the areas of the data track 20 which are shown light do not have depressions and are designated as land 23.

Figure 6:
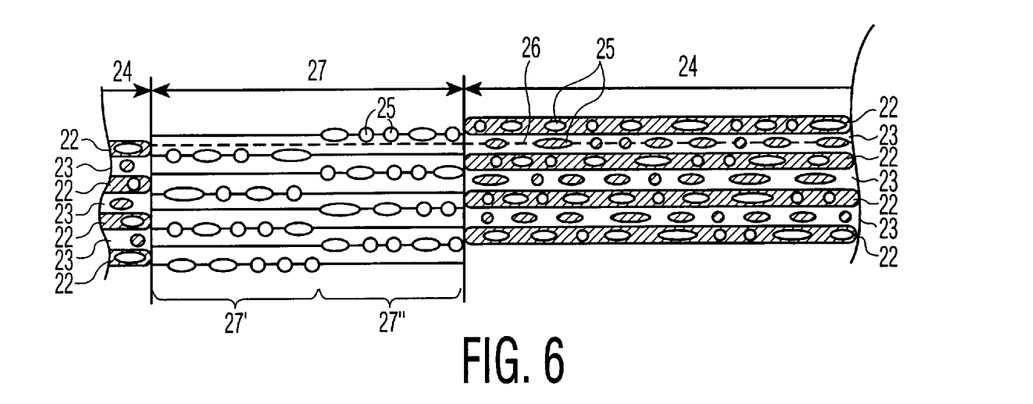
FIG. 6 shows a diagrammatic illustration of the different areas of a recording medium which can be read from and/or written to by a device according to the invention.

The transition area 21 is emphasized greatly enlarged in FIG. 6. A plurality of parts of the data track 20 which run essentially parallel and are formed by depressions 22 and by land 23 are evident in the right-hand and in the extreme left-hand part of FIG. 6. Areas 24 of centred markings 25 are illustrated in the right-hand and in the extreme left-hand region of FIG. 6. The markings 25 are arranged essentially centred with respect to a track centre 26 which is shown dashed by way of example. The markings 25, which are often referred to as pits as well, for their part consist, for example, in depressions or elevations relative to the corresponding data track, of areas of increased or reduced reflectivity in comparison with the rest of the data track, in areas which change the polarization direction of the light, or, in general, of areas which are suitable in any way for modulating the impinging light beam 3 in an optical or another, for example electromagnetic, property. An area 27 of off-centre markings 25 is situated between the areas 24 of centred markings. The area 27 of off-centre markings itself is once again subdivided into a first area 27' and a second area 27" of differently offset markings. The area 27 thus alternately has markings which are offset to the right and to the left with regard to the track centre and markings which are offset to the left and to the right with regard to the track centre, depending on whether the area 27 is traversed coming from a depression 22 or coming from a land 23 in the track direction from left to right.

Although only the transition area 21 is illustrated in FIG. 6, a multiplicity of areas 27 of off-centre markings are arranged alternately with areas 24 of centred markings per revolution of the data track 20. The extents of the areas 27 of off-centre markings in the track direction are significantly shorter than those of the areas 24 of centred markings. It is envisaged that the areas 27 and also the off-centre markings 25 arranged there will be fixedly predetermined as early as during production of the recording medium 1, whereas the markings 25 in the area 24 of centred markings will still not be present during production of the recording medium 1. They can then be written to the recording medium by the device according to the invention. In order to ensure suitable tracking in the areas 24 that have not as yet been written to, the properties designated as land 23 and as depression 22 are likewise fixedly predetermined as early as during production of the recording medium. In a special variant of the recording medium 1, provision is made for allowing the data track 20 to have a slightly wavy profile in the area 24 of centred markings. This is also referred to as "wobble". From the frequency of this wobble, it is possible to obtain further information which is necessary or helpful for the operation of the device. It is understood that the exemplary embodiment of a recording medium which is specified in FIGS. 5 and 6 is mentioned only by way of example. Recording media which do not have all of the features mentioned or which have additional features not mentioned here can also be read from and/or written to by a device according to the invention. Thus, for example, it is not absolutely necessary for the markings in the areas 27' and 27" to be removed to the same extent from the track centre 26, or for them to have the same length in the track direction.

Figure 2:
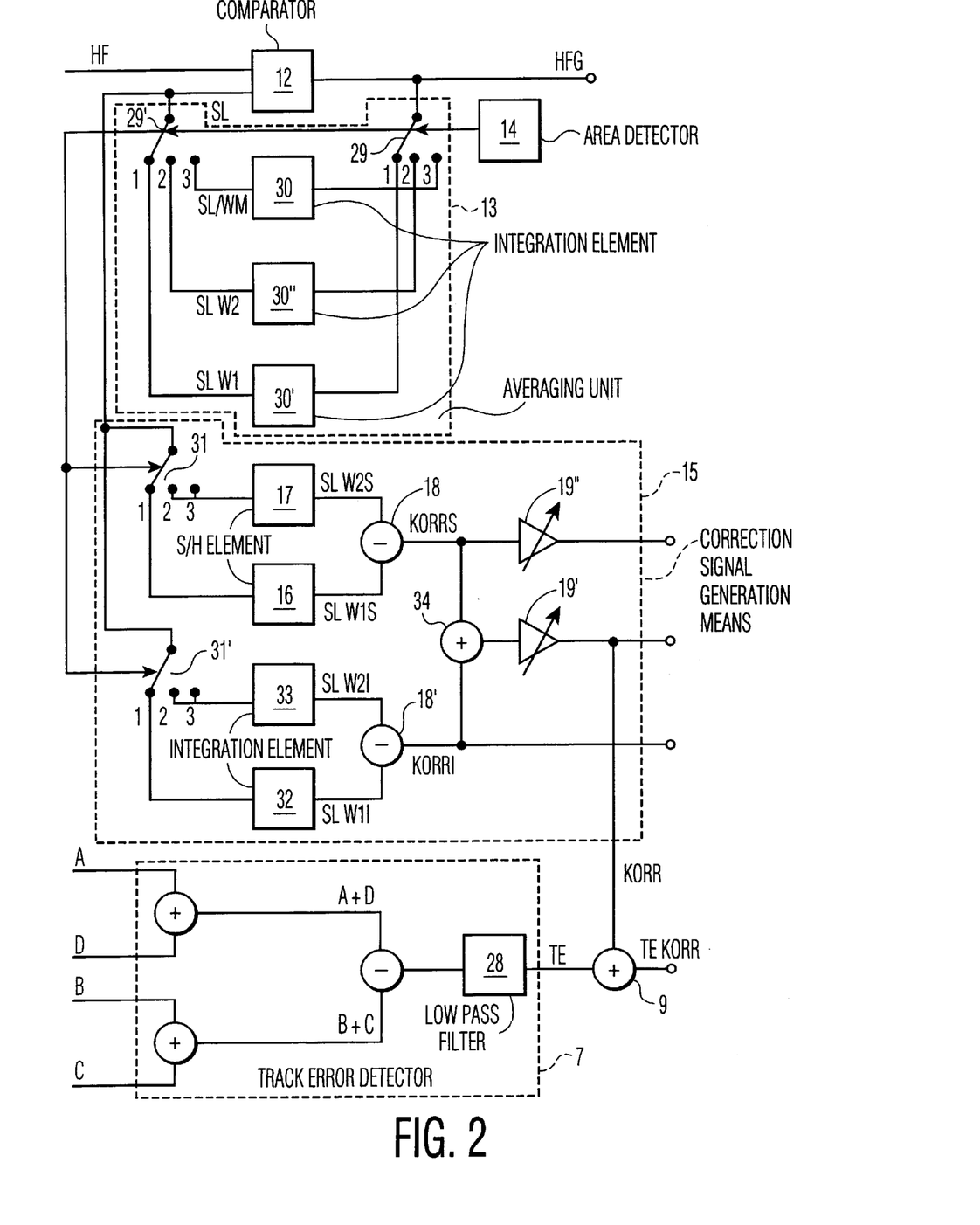
FIG. 2 shows track error detector, signal shaping means and correction signal generation means of a first device according to the invention.

FIG. 2 shows an exemplary embodiment of a first device according to the invention. The track error detector 7 is illustrated in the lower region, in which detector the signals of the photoelements A and D, and. B and C, are summed, the sums obtained are subtracted from one another and this difference is output as track error signal TE by means of a low-pass filter 28. This track error signal is combined with the correction signal KORR at the summation point 9 and output as corrected track error signal TEKORR.

The comparator 12, to which the high-frequency, modulated signal HF, on the one hand, and the comparison signal SL, on the other hand, are fed, is evident in the upper region of FIG. 2. The output signal of the comparator 12, the shaped data signal HFG is output, on the one hand, and, on the other hand, is connected to an integration element 30, 30' or 30" via a switching means 29, which is driven by the area detector 14. The shaped data signal HFG determined for the area 24 of centred markings is fed to the integration element 30, while the shaped data signal HFG corresponding to the area 27' of off-centre markings is fed to the integration element 30' and the shaped data signal HFG corresponding to the area 27" of off-centre markings is fed to the integration element 30". The output signal of the integration element 30, the comparison signal SLWM, and also the output signals of the integration elements 30' and 30", the comparison signals SLW1 and SLW2, are fed as comparison signal SL to the comparator 12 by means of a switch 29', which is likewise controlled by the area detector 14. In this way, it is possible to assign to the comparator 12 precisely at the right time during the area 27 of off-centre markings a comparison value SLW1 or SLW2 corresponding to this area. The corresponding comparison value is held during the remaining time. Corresponding holding is also carried out for the other areas as long as they are not scanned. Each area 24, 27', 27" is thus assigned its own comparison value SLWM, SLW1, SLW2. It is thus ensured that the comparison signal with the respective area is adapted to the average value of the shaped data signal HFG only at the correct time and is held in the remaining time. The integration elements 30, 30' and 30" additionally have a sample-and-hold function for this purpose. The individual comparison signals SLWM, SLW1 and SLW2 are not influenced by the value of the shaped data signal HFG of the respective other areas.

If the data track 20 is read continuously and without any track errors, that is to say with a light beam 3 which is centred with respect to the track centre 26, then the comparison signals SLW1 and SLW2 of the markings in the areas 27' and 27", which markings deviate symmetrically from the imaginary track centre 26, have the same magnitude. However, if the data track 20 is read out such that it is not centred accurately with respect to the track centre 26, that is to say when a track error is present, then the comparison signals SLW1 and SLW2 of the areas 27' and 27" deviate from one another, to be precise they deviate from one another more, the greater the deviation from the track centre is. The difference between the comparison signals SLW1 and SLW2 thus indicates the magnitude of the track error. By means of suitable logic combination, that is to say weighted addition which is correct in terms of sign, an error in the track error signal, which results from movement of the lens 2 parallel to the surface of the recording medium, for example, when using the push-pull method, can thus be compensated for by the correspondingly determined correction signal. For this purpose, the sample-and-hold elements 16 and 17 are provided, to which the respectively current comparison signal SLW1 or SLW2 present at the comparator 12 is applied by means of a switching means 31 which is influenced by the area detector 14. The held signals SLW1S and SLW2S are subtracted from one another in the difference forming unit 18. A first correction signal KORRS, which corresponds to proportional compensation, is present at the output of the difference forming unit 18. The proportional correction signal KORRS is used to compensate for example for a track error which occurs as a result of a movement of the lens parallel to the surface of the recording medium but essentially perpendicularly to the track direction. In the event of such a displacement of the lens 2, the optical axis thereof is generally shifted from the optical axis of the rest of the optical system (not completely illustrated here), as a result of which, on the one hand, the light beam 3 impinging on the recording medium 1 is displaced in a desirable manner but, on the other hand, a displacement of the reflected light on the detection means 5 is brought about at the same time. The effect of this is that even in the event of centred scanning, a track error which is not present is detected, which leads to the light beam 3 being displaced from the track centre. This undesirable offset is compensated for by means of the proportional correction signal KORRS.

A further error in the track error signal occurs, for example, as a result of static electrical offsets in the formation of the track error signal, caused for example by ageing of the components used. Such an error is eliminated according to the invention by means of integrating compensation. For this purpose, integration elements 32, 33 are present which are connected via a switching means 31' which is influenced by the area detector 14, to the comparison signals SLW1 and SLW2, respectively, when the latter are also present at the comparator 12. The output signals of the integration elements 32, 33, the integrated signals SLW1I and SLW2I, are subtracted from one another in a difference forming unit 18'. The output signal of the difference forming unit 18' is the integrated correction signal KORRI.

In the exemplary embodiment illustrated, the correction signals KORRS and KORRI are summed at a summation point 34 and fed, having been amplified by means of an amplifier 19' having a variable gain factor, as correction signal KORR to the information point 9. The advantages both of proportional and of integrating compensation are utilized in this way. Corresponding weighting upstream of the summation point 34 is provided but is not explicitly illustrated here. The correction signals KORRS and KORRI can also be used further individually, if appropriate likewise by means of an amplifier 19" having a variable gain factor.

The output voltage is added to the track error signal in a weighted manner correctly in terms of sign and thus effects dynamic or static compensation of an offset in the track error signal. This requires that the gain factor of the variable amplifiers 19', 19" be chosen suitably. If the said factor is too high, then overcompensation takes place; if it is too low, then the compensation is insufficient. The method specified in the application DE 196 30 887, which was not published before the priority date, comes into consideration as a method for automatically setting the gain of the amplifiers 19', 19".

Figure 4:
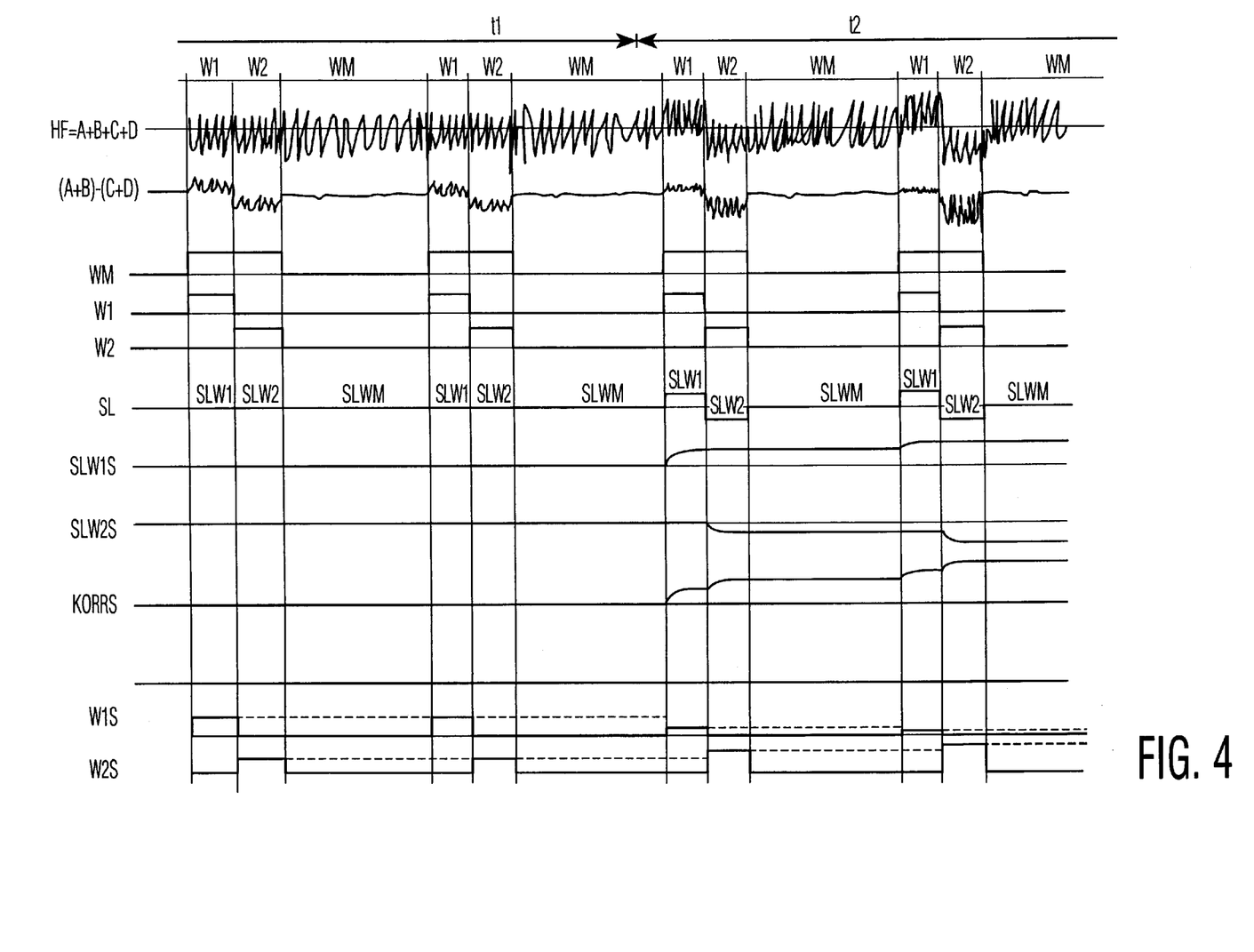
FIG. 4 shows exemplary signals which occur during operation of a device according to the invention.

FIG. 4 shows exemplary signals which occur during operation of a device according to the invention. In this case, the time axis runs from left to right; no offset occurs in the left-hand region t1, that is to say the data track 20 is scanned in an exactly centred manner, whereas an offset of this type occurs in the right-hand region t2. In the upper region of FIG. 4, specification of the signals W1, W2 and WM indicates which of the areas 27', 27" and 24 of off-centre and centred markings, respectively, is scanned. In the left-hand region t1, the high-frequency, modulated signal HF composed of the sum of the signals of the photoelements A, B, C, D still does not have any relatively large differences between areas of centred markings and areas of off-centre markings. When an offset occurs in the region t2, the average values in the areas 27', 27" of off-centre markings differ.

In the signal (A+B)–(C+D) represented underneath, the detector signals A, B, C, D occurring in the area 24 of centred markings average virtually zero, whereas a high-frequency signal occurs in the areas 27', 27" of off-centre markings. Here, too, the average value and, in addition, the amplitude are shifted in the right-hand region t2, that is to say when an offset occurs.

The next three signals illustrated correspond to the output signals of the area detector 14 as described with reference to FIG. 1, the signal WM assuming a value High when an area 27 of off-centre markings is scanned, whereas it assumes a value Low when the area 24 of centred markings is scanned. The signal W1 assumes a value High only when the area 27' of off-centre markings is scanned. The signal W2 assumes a value High only when the other area 27" of off-centre markings is scanned. In all other cases, the signals W1 and W2 assume a value Low.

The comparison signal SL is illustrated next. In this case, the respectively selected comparison signals SLW1, SLW2 and SLWM are noted on the signal in the corresponding time intervals. In the case where there is no offset, that is to say in the region t1, the comparison values SLW1 and SLW2 have the same magnitude. In this case, the comparison signal SLWM is likewise specified with the same magnitude, but it may also assume a different value, this not being relevant to the compensation treated here. The area detector 14 switches the comparison signal SL in a manner corresponding to that described with reference to FIG. 2. The sample-and-hold elements 16 and 17 sample and hold the comparison values SLW1 and SLW2 of the respective data area W1 and W2; their output signals SLW1S and SLW2S are specified in the curves which follow underneath. The difference between these comparison signals, the proportional correction signal KORRS, is proportional to the difference between the comparison signals SLW1 and SLW2 and thus to the tracking offset. It correspondingly holds true for the integration elements 32, 33, whose signal curves are not illustrated here, that the differences between the comparison values SLW1 and SLW2 are also integrated. Given a constant value of the tracking offset, their output voltage SLW2I and SLW1I rises continuously. If the difference between these output voltages is used as integrated correction signal KORRI, then the integrated compensation voltage KORRI rises until the tracking offset is completely compensated for and the voltage comparison-signals SLW1 and SLW2 no longer differ, on average.

The two lower curves of FIG. 4 show signals W1S and W2S, which occur in the exemplary embodiment described with reference to FIG. 7 and are also described there.

Figure 3:
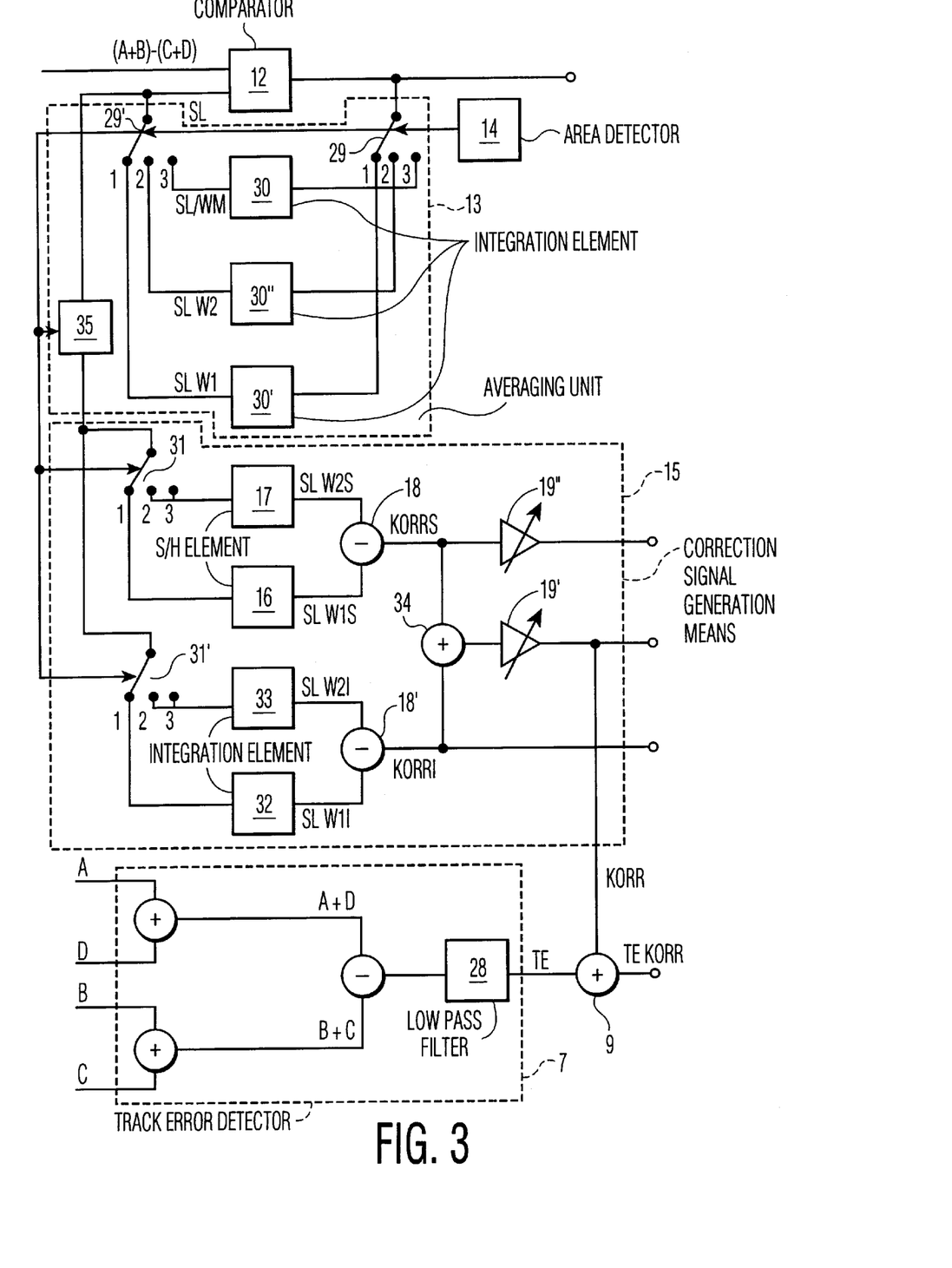
FIG. 3 shows track error detector, signal shaping means and correction signal generation means of a second device according to the invention.

FIG. 3 differs only slightly from FIG. 2; identical elements are provided with the same reference symbols and are described anew only if their function has changed. Instead of the high-frequency, modulated signal HF, the signal (A+B)–(C+D) is used in this case as input signal for the comparator 12. In this case adder 11 is also provided with inverters, which are not explicitly shown in FIG. 1, to invert the output signals of photoelements C and D before adding these signals to the output signals of photoelements A and B. The shaped data signal HFG referred to in FIG. 1 in this case represents the shaped signal (A+B)–(C+D). Since the offset-dependent effect has an inverted profile when this signal is used, one of the comparison signals SLW1 or SLW2 is inverted by means of a signal influencing element 35. The signal influencing element 35 can be switched in response to a signal from the area detector 14. Depending on the switching state, it is operated as voltage follower or as inverter. The latter is switched for the area 27' or 27" of off-centre markings. Depending on the selection, the correction signal KORR obtained is then positive or negative, which is to be taken into account in the sign during the compensation.

The present invention consequently relates to a method for forming a compensation or correction signal KORR for a track error signal TE, which is obtained from the slice levels SLWM, SLW1, SLW2 of pre-impressed markings 25 arranged in a particular manner, also called pre-pits.

The method is used particularly in optical storage media containing formattings which are pre-impressed in a particular form, for example markings which deviate in pairs and symmetrically from the imaginary track centre 26. An area detector 14 is present, for example an envelope detector, which unambiguously identifies the different areas 24, 27, 27', 27" of the data track 20. Also present is a special comparator, a so-called data slicer, which provides a dedicated slice level SLWM, SLW1, SLW2 for each area of the data track. And a means is present which generates the correction signal KORR from the difference between the slice levels of the pre-impressed areas, which correction signal compensates for an offset of the track error signal TE in a suitable manner. The invention can preferably be employed in CD players, CD recorders, DVD reproduction and recording devices and the like.

Figure 7:
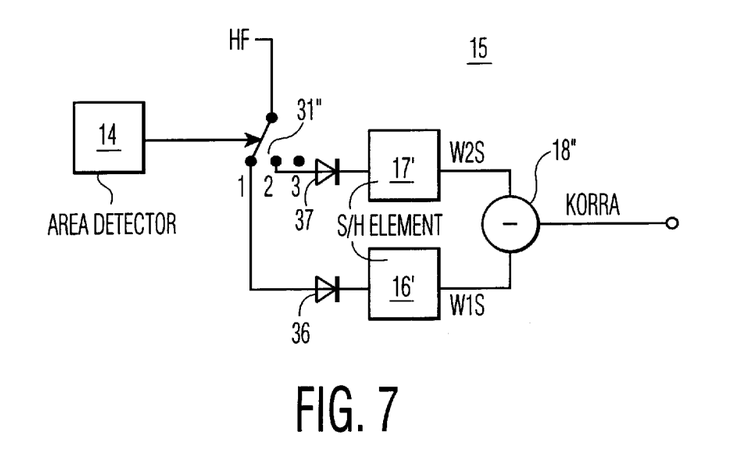
FIG. 7 shows part of a device according to the invention, of a further configuration.

FIG. 7 shows part of a device according to the invention, of a further configuration, whose other parts correspond to the configurations described above, for example. A correction signal generation means 15 is evident, in which the correction signal KORRA is formed by means of amplitude measurement of the respective first and second areas 27', 27" of off-centre markings. For this purpose, as input signal, for example, the high-frequency, modulated signal HF or the signal (A+B)–(C+D) is connected to one of the signal processing paths of the correction signal generation means 15 by a switching means 31", which is controlled by the area detector 14. Each of the signal processing paths has a rectifier 36, 37 and also a sample-and-hold element 16', 17". The output signals of the two signal processing paths in the exemplary embodiment are fed to a difference forming unit 18", at whose output the correction signal KORRA is present. This signal is logically combined with the track error signal TE, as described above with regard to the correction signal KORR.

If an offset is not present in the track error signal, then the amplitudes of the signals assigned to the areas 27', 27" of off-centre markings 25 are identical, while the amplitudes change in opposite directions given the presence of an offset. Consequently, a correction voltage KORRA is generated from the difference between the amplitudes of the at least two areas 27', 27", which correction voltage is in turn added to the track error signal TE in a weighted manner correctly in terms of sign.

The averaging unit 13 is, for example, an integrator that integrates the output signal of comparator 12. Instead of the different examples described above for comparator 12 and averaging unit 13, having data signal HF or signal (A+B)–(C+D) as input signal, and acting, in combination, as a so-called data-slicer, any other type of data-slicer may also be used here.

What is claimed is:

1. Device for reading from or writing to an optical recording medium, including a data track having a first area provided for markings which are centred with respect to the centre of the data track, and at least one further area provided for markings which are laterally offset with respect to the centre of the data track, said device comprising:
   a detection means for generating a detector signal from said data track,
   a track error detector for generating a track error signal,
   a signal shaping means including an averaging unit and a comparator, at whose output a shaped data signal is present, whose first input is supplied with a detector signal, and whose second input is connected to the output of the averaging unit, and
   a correction signal generating means for generating a correction signal,
wherein
   the output of the averaging unit is connected to an input of the correction signal generation means; and said correction signal and said track error signal are combined.

2. Device according to claim 1, wherein the averaging unit has at least two comparison signal generation paths, which are activated by a switching means in dependence on the scanned area of the data track.

3. Device according to claim 2, wherein the correction signal generation means has at least two signal processing paths, whose inputs are connected to or disconnected from the input of the correction signal generation means by a switching means.

4. Device according to claim 3, wherein the signal processing path has a holding element or an integration element.

5. Device according to claim 2, wherein the correction signal generation means has at least one amplification element having a variable gain factor.

6. Device according to claim 1, wherein the correction signal generation means has at least two signal processing paths, whose inputs are connected by a switching means to or disconnected from the input of the correction signal generation means by a switching means.

7. Device according to claim 6, wherein the signal processing path has a holding element or an integration element.

8. Device according to claim 6, wherein the output of a first and of a second signal processing path is connected to the input of a difference forming unit.

9. Device according to claim 8, wherein the outputs of a plurality of difference forming units are connected to a summation point.

10. Device according to claim 1, wherein the correction signal generation means has at least one amplification element having a variable gain factor.

11. Device according to claim 1, wherein the detection means has several photoelements the outputs of which are connected to inputs of an adder, and that the output of the adder is connected to an input of the comparator.

12. Device according to claim 11, wherein the adder has at least one inverter to invert the sign of the output signal of a photoelement before adding.

13. Device for reading from or writing to an optical recording medium, which has a data track having a first area, provided for marking which are centred with respect to the centre of the data track, and at least one further area provided for markings which are laterally offset with respect to the centre of the data track, said device comprising:

a detection means for generating a detector signal from said data track;

a track error detector for generating a track error signal;

a signal shaping means; and a correction signal generating means for generating a correction signal;

wherein the correction signal generating means has at least two signal processing paths, whose inputs are, by a switching means, connected to or disconnected from at least one output of the detection means, and said correction signal and said track error signal are combined.

14. Method for generating a corrected track error signal in a device for reading from and/or writing to an optical recording medium, which has a data track having a first area, which is provided for markings which are centred with respect to the centre of the data track, and at least one further area, which is provided for markings which are laterally offset with regard to the centre of the data track, the method comprising the following steps:

detecting a detector signal;

generating a track error signal from the detector signal;

forming a shaped data signal from the detector signal using a comparison signal;

generating the comparison signal by averaging the shaped data signal;

generating a track error correction signal from the comparison signal;

combining the track error signal and the track error correction signal to generate the corrected track error signal.

15. Method according to claim 14, wherein different comparison signals, which are used to generate the track error correction signal, are provided for the scanning of different areas of the data track.

16. Method according to claim 15, wherein use is made exclusively of comparison signals which correspond to one of the further areas of the data.

* * * * *